US012129982B1

United States Patent
Haywood et al.

(10) Patent No.: US 12,129,982 B1
(45) Date of Patent: Oct. 29, 2024

(54) LIGHT SYSTEM WITH A THICK LENS WITH AN INDIRECTLY FIRED LIGHT

(71) Applicant: Valeo Vision, Bobigny (FR)

(72) Inventors: Drew Haywood, Auburn Hills, MI (US); Brian Burkart, Auburn Hills, MI (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/459,967

(22) Filed: Sep. 1, 2023

Related U.S. Application Data

(60) Provisional application No. 63/503,722, filed on May 23, 2023.

(51) Int. Cl.
| | |
|---|---|
| *F21S 41/26* | (2018.01) |
| *B60Q 1/00* | (2006.01) |
| *F21S 41/147* | (2018.01) |
| *F21S 41/148* | (2018.01) |
| *F21S 41/24* | (2018.01) |
| *F21S 41/27* | (2018.01) |
| *F21S 41/33* | (2018.01) |

(52) U.S. Cl.
 CPC ............ *F21S 41/26* (2018.01); *F21S 41/332* (2018.01); *B60Q 1/0011* (2013.01); *F21S 41/147* (2018.01); *F21S 41/148* (2018.01); *F21S 41/24* (2018.01); *F21S 41/27* (2018.01)

(58) Field of Classification Search
 CPC ........ F21S 41/147; F21S 41/148; F21S 41/24; F21S 41/26; F21S 41/27; G02B 6/0011; G02B 6/0033–0055; F21V 7/0008; F21V 7/0016; B60Q 1/0011
 See application file for complete search history.

(56) References Cited

U.S. PATENT DOCUMENTS

| | | | |
|---|---|---|---|
| 9,360,183 B2 | 6/2016 | Ichikawa et al. | |
| 11,713,857 B1 | 8/2023 | Darlage et al. | |
| 2002/0057575 A1 | 5/2002 | Schwanz et al. | |
| 2004/0190303 A1 | 9/2004 | Mishimagi | |
| 2006/0146555 A1 | 7/2006 | Inaba | |
| 2009/0051523 A1 | 2/2009 | Perkins | |
| 2010/0327747 A1 | 12/2010 | Harris | |

(Continued)

FOREIGN PATENT DOCUMENTS

| | | | |
|---|---|---|---|
| KR | 20230000841 A | * | 1/2023 |
| KR | 20230000845 A | * | 1/2023 |
| WO | 2012005412 A1 | | 1/2012 |

OTHER PUBLICATIONS

Machine translation of KR 20230000841 A retrieved from the FIT database of PE2E search. (Year: 2023).*

(Continued)

*Primary Examiner* — Colin J Cattanach
(74) *Attorney, Agent, or Firm* — Young Basile Hanlon & MacFarlane, P.C.

(57) ABSTRACT

A light system including a lens, a reflector, and a light source. The lens has body portion and a waterfall portion that extends at an angle relative to the body portion so that the waterfall portion is exposed when the light system is installed in a vehicle. The reflector is located adjacent to the lens. The light source is located adjacent to the lens that is configured to provide light to the reflector so that the reflector reflects the light through the waterfall portion so that the waterfall portion is illuminated.

20 Claims, 3 Drawing Sheets

(56) References Cited

U.S. PATENT DOCUMENTS

| | | | |
|---|---|---|---|
| 2012/0081915 A1 | 4/2012 | Foote et al. | |
| 2013/0242586 A1 | 9/2013 | Huizen et al. | |
| 2014/0226355 A1* | 8/2014 | Blandin | F21S 41/33 |
| | | | 362/543 |
| 2015/0345730 A1* | 12/2015 | Kim | F21S 43/255 |
| | | | 362/516 |
| 2016/0273728 A1* | 9/2016 | Izawa | B60Q 1/0041 |
| 2019/0064423 A1* | 2/2019 | McCarter | F21S 43/245 |
| 2022/0252236 A1* | 8/2022 | Thiel | F21S 45/47 |

OTHER PUBLICATIONS

Machine translation of KR 20230000845 A retrieved from the FIT database of PE2E search. (Year: 2023).*

* cited by examiner

LIGHT SYSTEM WITH A THICK LENS WITH AN INDIRECTLY FIRED LIGHT

CROSS-REFERENCE TO RELATED APPLICATION(S)

This application claims priority to and the benefit of U.S. Provisional Patent Application Ser. No. 63/503,722, filed May 23, 2023, the entire disclosure of which is hereby incorporated by reference.

FIELD

The present teachings relate to a light system including a lens including a waterfall portion that is indirectly illuminated by a light so that the waterfall appears to be a thick light blade.

BACKGROUND

Vehicles include many different types of lights. Some types of lights included on a vehicle are low beam headlights, high beam headlights, taillights, turn signal lights, fog lights, running lights, or a combination thereof. Each of these lights extend out of an outer surface of a vehicle so that they provide light for the driver or provide notice to surrounding drivers. The light systems in addition to providing notice and illuminating surroundings also create an aesthetic of a vehicle.

Thus, there is a need for a light system with a lens that appears thick from an exterior of the light system without a lens of the light system having an actual thickness that matches a viewed thickness. There is a need for an indirect fire of a lens. There is a need for lenses that have a length with a waterfall that appears to be a thickness of the lens. It would be desirable to have a lens with a length that appears to be a thickness of the lens.

SUMMARY

The present teachings provide: a light system including a lens, a reflector, and a light source. The lens has body portion and a waterfall portion that extends at an angle relative to the body portion so that the waterfall portion is exposed when the light system is installed in a vehicle. The reflector is located adjacent to the lens. The light source is located adjacent to the lens that is configured to provide light to the reflector so that the reflector reflects the light through the waterfall portion so that the waterfall portion is illuminated.

The present teachings provide a lens having a body portion and a waterfall portion that is connected to the body portion and extends at an angle relative to the body portion so that the waterfall portion faces an exterior of a vehicle that contains the lens; and wherein the waterfall portion has a length, a width, and a thickness; wherein light is directed through the thickness of the waterfall portion to illuminate the length and the width of the lens.

The present teachings provide a light system with a lens that appears thick from an exterior of the light system without a lens of the light system having an actual thickness that matches a viewed thickness. The present teachings provide an indirect fire of a lens. The present teachings provide lenses that have a length with a waterfall that appears to be a thickness of the lens. The present teachings provide a lens with a length that appears to be a thickness of the lens.

DETAILED DESCRIPTION

Figure 1:
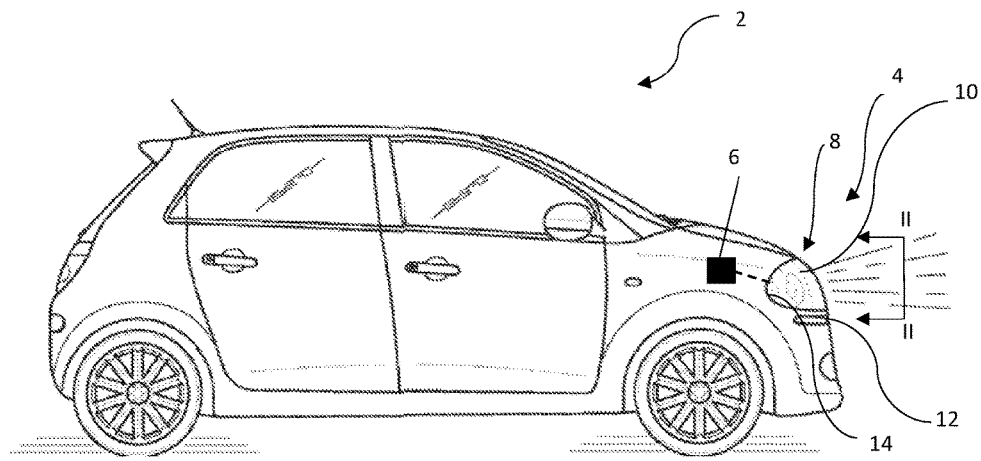
FIG. 1 is a side view of a vehicle including a light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light in a forward direction, rear direction, side direction, vertical direction (e.g., z-axis), from a fore to an aft, an aft to a fore, or a combination thereof. The fore may be a forward direction of a vehicle or a front. The aft may be a rear direction of a vehicle or a rear. Preferably, the light system projects a light from an external surface of the vehicle to a location in front of the vehicle or at an angle relative to the front or rear of a vehicle. The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light systems may be multiple light systems or light sources stacked one above the other, side by side, within different planes, within a same plane and projecting in different directions, integrated into a single light system, or a combination thereof. The light system may have multiple smaller light systems or light sources. The plurality of light systems or lights may be located in one light system. The plurality of light systems may operate independently of one another such that one light system may not affect another light system or portion of the light system. The light of the vehicle may be two or more, three or more, or four or more light systems located adjacent one another. The light system may be or include one or more static lights, one or more movable lights, and one or more light sources.

The light sources function to produce light. The light source may be a device or a plurality of devices that create light and the light extends outward from the light source. The light source may produce a high beam, a low beam, a blending beam, a running light, a daytime running light (DRL), a turn signal, a brake light, or a combination thereof. The light sources may have different functions. For example, one light source may provide a daytime running light and another light source may be a turn signal. Preferably, a first light source and a second light source combine together to provide a single light function. The light source may comprise a plurality of lights or may be a single light source within a set of light sources. The plurality of lights may be in one set or group of light sources. The plurality of lights may be located in rows, columns, a matrix, or a combination thereof. The light source may be a single light that projects light. In another example, a light source may direct light in a first direction and a second light source may direct light in a second direction that is different from the first direction. The first light from a first light source and the second light from a second light source may extend in different directions but may be visibly combined to provide a light function. The first direction may be along a z-axis within a coordinate system. The second direction may be along an x-axis within a coordinate system. The light source may direct light through a vertical portion of a lens (e.g., a waterfall portion).

The light sources may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light sources may be a single lamp or bulb. Preferably, the light sources are part of a set of light sources that includes a plurality of lamps, bulbs, diodes, or a combination thereof. The light sources may be part of a set of light sources that includes 2 or more, 3 or more, 4 or more, 5 more, 7 or more, 9 or more, or 11 or more light sources that produce light and combine together to form the light extending from the light system. The sets of light sources may include 20 or less, 18 or less, 16 or less, or 14 or less devices that produce light (e.g., each set may include 8 light sources or alternatively all of the sets when combined together may include 8 light sources or 2 light sources). For example, the set of light sources may be the contents of a single printed circuit board that perform a same lighting function and the set of light sources may be 8 light sources that are all located on the single printed circuit board. The set of light sources may be two or more groups of lights that are located on different printed circuit boards. The printed circuit boards may be located adjacent to one another or spaced apart from one another. The number of light sources in a part of the light may dependent upon a size of the region or a size illuminated. For example, a daytime running light may have eight or more light sources and a turn signal may have five or more light sources. In another, example, the daytime running light may include two or more groups of light sources that are spaced apart from one another such that when the two or more groups of light sources are on they combine to provide the first light function.

The light source may be one or more lights, two or more lights, or three or more lights. The light source may be static. The light sources may be free of movement. The light source may be fixed. The light sources may be a row of lights, a column of lights, a matrix of lights extending in rows and columns, or a combination thereof. For example, a matrix may have lights that are set out to be 2×2 or more, 3×3 or more, 4×4 or more, 5×5 or more, 6×6 or more, 7×7 or more, 8×8 or more, 9×9 or more, 10×10 or more. The matrix may be 100×100 or less, 75×75 or less, 50×50 or less, 25×25 or less, or even 15×15 or less. The matrix of lights may direct light through a lens (e.g., a body portion). The light sources may be a row of light sources that direction light into the lens (e.g., a body portion). The matrix may be made up of a single printed circuit board. The light sources may be located in a line or a row. The light sources may be static and may be manually or physically adjusted so that the light sources are directed to a desired location. The light sources may be fixed and the light from the light source may be moved, bent, directed, or a combination thereof by optical elements, textured portions, micro-optics, reflectors (e.g., a light guide), light blades, or a combination thereof. Each individual light of the light source may be turned on and off. The light sources may provide light towards a reflector and then the reflector may redirect (i.e., reflect) the light in a second direction. Some light sources may direct light into light pipes and some light sources may direct light towards a reflector.

The light sources (or set of light sources) of the light system may produce one light function and a second light source (or set of light sources) may produce a second light function. One light system (e.g., a bi-directional light system) may include a plurality of light sources (e.g., two or more) that produce one light function. The light system may perform only a single light function. The light system, via the light sources, may perform or provide one or more light functions, two or more light functions, or even three or more light functions. The light system may provide one or more light patterns, two or more light patterns, or three or more light patterns with a single light system. The light sources may be directed towards reflectors that redirect the light produced so that a light function with a light pattern (e.g., a headlight or DRL) is generated and/or visible exterior to the vehicle.

The reflectors may all be located within a housing and function to redirect the light in a predetermined pattern. The reflectors may direct light through a lens. The reflectors may provide indirect light (e.g., light that is directed in a first direction by a light source and then changed to a second direction by the reflector). The reflectors may all direct light and the light may combine to form a predetermined pattern. The reflectors may each provide light to a predetermined region to form part of a pattern, part of a function, or both. One reflector may be located adjacent to one light source. The reflectors may be a plurality of reflectors. The light system may include two or more, three or more, four or more, six or more, eight or more, ten or more, twelve or more, or even fourteen or more reflectors. The light system may include 50 or less, 40 or less, 30 or less, 20 or less, or 15 or less reflectors. The reflectors may be a single reflector. The reflectors may have a portion that extends parallel to a body portion of a lens and a portion that extends around a waterfall portion of a lens. The reflectors may direct light through the waterfall portion of a lens. The reflectors may include a planar portion and a curved portion.

The planar portion functions to connect the reflector within the light system. The planar portion extends parallel to the body portion of the lens (e.g., a daytime running light lens (DRL lens)). The lens may be made of or include a polycarbonate, acrylic, or both. The planar portion may support the printed circuit board. The planar portion may be a support for the printed circuit board to connect the printed circuit board relative to the curved portion. The planar portion may extend from a rear of the light system towards a front of the light system. The planar portion may extend along all or a portion of a length of a body portion of the lens. The planar portion may support a printed circuit board. A part of the planar portion may connect within the light system and a part of the planar portion may connect to the printed circuit board. The printed circuit board may have a portion that extends outward from the planar portion (e.g., is not in direct contact with the planar portion). The planar portion may support the printed circuit board relative to the curved portion. The planar portion may support the curved portion or vice versa.

The curved portion functions to direct light from an interior of the vehicle system to an exterior of the vehicle system. The curved portion may redirect light from a light source through the lens (DLR) lens, the waterfall portion, or both. The curved portion may extend from the planar portion. The curved portion may be curved to redirect the light to a predetermined location, in a predetermined intensity, through the waterfall portion, or a combination thereof. The curved portion may extend downward away the planar portion or the body portion of the lens. The curved portion may extend towards the waterfall portion. The curved portion may connect with the waterfall lens, a bottom of the waterfall lens, or both. The curved portion may direct light to the waterfall lens. The curved portion may direct light so that the entire waterfall lens is illuminated. The curved portion may assist in obscuring all or a portion of the light source, the printed circuit board, or both from view outside of the light system. For example, the length and the width of the waterfall lens may be illuminated so that when viewed from an exterior the entire waterfall lens may be lightened. Light may be directed from a light source into contact with the reflector and then the light may be directed from the reflector directly through the waterfall portion of the of the lens to provide a parking indicator (PI), a turn indicator (TI), daytime running light (DRL), or a combination thereof. A shape and a size of the curved portion of the reflector may direct the light to a region of interest. The curved portion may direct the light so that the entire waterfall portion is illuminated. The curved portion may have a curve that directs light through the waterfall portion. The curved portion may be located adjacent to a lens (e.g., the daytime running light lens (DRL lens)).

The lens (e.g., DRL lens) functions to provide light outside of a vehicle, notice to oncoming vehicles, or both. The lens may provide notice during the day. The lens may be visible when the light sources are off and when the light sources are on. The lens may have one or more visible portions. The entire lens may be visible. The lens may include a waterfall portion and a body portion. The body portion may extend along a first surface of a vehicle and the waterfall portion may extend along a second surface of the vehicle.

The body portion functions to retain the lens (e.g., DRL lens, TI lens, and PI lens) within the light system. The body portion may provide light or may allow visible light to be displayed. The body portion may generate a primary light, a secondary light, or both. The body portion may allow light to pass therethrough. The light may extend through the body portion in a direction parallel to vertical. The light through the body portion may be a secondary light that provides some secondary light function. The light may provide notice. The light may provide a display through the body portion. The light may not be part of a daytime running light. The body portion may extend internally within the light system, a housing, or both. The body portion may extend from a rear end of the light system toward a front of the light system. The body portion may extend at an angle. The body portion may extend at a downward angle (relative to a road surface or vertical). The angle may be about 90 degrees or less, about 75 degrees or less, about 60 degrees or less, about 50 degrees or less, or about 45 degrees or less relative to vertical (e.g., direction of gravity). The angle may be 0 degrees or more, about 15 degrees or more, about 30 degrees or more, or about 40 degrees or more (e.g., about 42 degrees) relative to vertical. The body portion may be free of any light, free of internal reflection, or both. The body portion may be aligned within the light system so that the waterfall portion is aligned with an exterior of the light system. Light may be directed through the body portion in the secondary direction (e.g., vertically). The body portion may be positioned so that light may be directed through the entire waterfall portion without the body portion interfering with the light being directed to the waterfall portion.

The waterfall portion functions to provide notice, glow, light up, or a combination thereof. The waterfall portion may be illuminated continuously, intermittently, when the car is on, when the car is moving, or a combination thereof. The waterfall portion may extend at an angle relative to the body portion. The angle between the waterfall portion and the body portion may be such that the body portion does not interfere with the waterfall portion, the waterfall portion is coplanar with an exterior of the light system, or both. The angle between the body portion and the waterfall portion may be about 180 degrees or less, about 175 degrees or less, about 150 degrees or less, about 135 degrees or less, about 115 degrees or less, or about 105 degrees or less. The angle between the body portion and the waterfall portion may be about 60 degrees or more, about 75 degrees or more, about 90 degrees or more, or about 100 degrees or more (e.g., about 132 degrees).

The waterfall portion includes a length (height) and a width. The length and width form an area that is illuminated. The entire area of the waterfall portion may be visible from an exterior of the vehicle. The length and width may be greater than a thickness such that the waterfall portion provides a larger area of illumination than a thickness of a same lens would. The length is visible from an exterior so that a visible area of the lens is larger than a thickness. The length when viewed from an exterior of the vehicle may appear as a thickness or height that is illuminated so that an length illuminated is greater than a thickness. The length and height combine to form an area that is illuminated. The length may be about 3 mm or more, about 5 mm or more, about 7 mm or more, about 1 cm or more, about 3 cm or more, about 5 cm or more, about 7 cm or more, or about 10 cm or more. The length may be about 50 cm or less, about 40 cm or less, about 30 cm or less, or about 20 cm or less. The thickness of the waterfall portion may be about 1 mm or more, about 2 mm or more, or about 3 mm or more. The thickness may be about 10 mm or less, 7 mm or less, or about 5 mm or less. The length to thickness may have a ratio of about 1:1 or more, about 1.2:1 or more, about 1.5:1 or more, about 2:1 or more, about 3:1 or more, or about 4:1 or more. The ratio may be about 10:1 or less, about 7:1 or less, or about 5:1 or less. The waterfall portion includes an interior side and an exterior side. The interior side may receive light and the exterior may project light, glow, illuminate, or a combination thereof. The exterior may be free of any textures, angled features, optics, features that direct light out of the waterfall portion of the lens, or a combination thereof. The exterior may assist to retain light within the waterfall portion such that the waterfall portion appears to have a homogeneous amount of light along a length, width, height, or a combination thereof. A thickness of the waterfall portion extends between the interior side and the exterior side.

The thickness functions to direct light outward and/or spread light. Light may be directly projected through the thickness of the waterfall portion. The light may directly extend from the interior side to the exterior side. The light may not be spread by the thickness. The light may not be redirected within the thickness by total internal reflection. For example, the light extending through the thickness may entirely illuminate an area of the waterfall portion (e.g., a length L2 and a width) without the light being internally reflected. The thickness may be less than the length, less than the width, or both. The interior may include optics, features that direct light into the waterfall portion, through the waterfall portion, or a combination thereof. The interior may include optics.

The optics function to prevent hot spots, provide a homogenous light pattern, a homogenous distribution, amount of light, intensity of light, direct light into a lens, or a combination thereof. The optics may spread the light, prevent overlaps of light from light sources, direct light out of the waterfall portion, direct light into the waterfall portion, spread light within the waterfall portion, or a combination thereof. The optics may provide a homogenous lighting appearance of a lens. The optics may be a texture be added one or more surfaces of a lens. For example, a texture may be sprayed on the waterfall portion, etched into the waterfall portion, mechanically added, mechanically formed, added during molding, added during manufacturing, or a combination thereof. The optics may be on an external surface, an internal surface, a location between the internal surface and the external surface, or a combination thereof. The optics may guide light out of the waterfall portion as the light travels through the waterfall portion. The optics may guide light into the waterfall portion. The optics may change a direction of the light. The optics may permit light to exit a surface or enter a surface. Some lenses may include a texture portion on or in an external surface and/or an internal surface. The optics may have a shape that is a pyramid, half circle, square, rectangle, zig zag patterns, lines, cylindrical, tetrahedron, cube, hexagonal, icosahedron, a prism, a pentagonal pyramid, a cone, cuboid, a symmetrical shape, an asymmetrical shape, a geometric shape, a non-geometric shape, or a combination thereof. The optics may only be located on an interior of the waterfall portion so that when light enters the waterfall portion the light is internally reflected within the waterfall portion.

The interior and the exterior of the waterfall portion may extend parallel to one another. The interior and the exterior are located a distance apart. The distance may be sufficiently large so that light may be internally reflected to provide a uniform amount of light throughout the waterfall portion. The distance may be 1 mm or more, 3 mm or more, 5 mm or more, or 7 mm or more. The distance may be 20 mm or less, 15 mm or less, 12 mm or less, 10 mm or less, or 8 mm or less. The interior may face the light source, receive light from the light source, or both. The interior may be the only portion of the waterfall portion to include optics. The interior may direct light into the waterfall portion. The exterior may be illuminated by light passing into the waterfall portion. The exterior may form an outer most portion of the DRL light. The exterior may extend coplanar to other portion of the light system, other lights, lenses of the headlights, or a combination thereof. The exterior may illuminate, allow light to pass through, or both. The light system may include a controller that controls the light source to provide light to the interior so that the exterior of the waterfall portion is illuminated.

The controller may control how the lights are illuminated, a light pattern, when the lights are illuminated, or a combination thereof. The controller may turn on the lights when the vehicle is turned on.

FIG. 1 illustrates a side view of a vehicle 2 including a light system 4. The light system 4 is in communication with a controller 6. The light system 4 includes a headlight 8 that is covered by an outer lens 10. The light system 4 also includes a daytime running light 12 and a turn signal 14.

Figure 2:
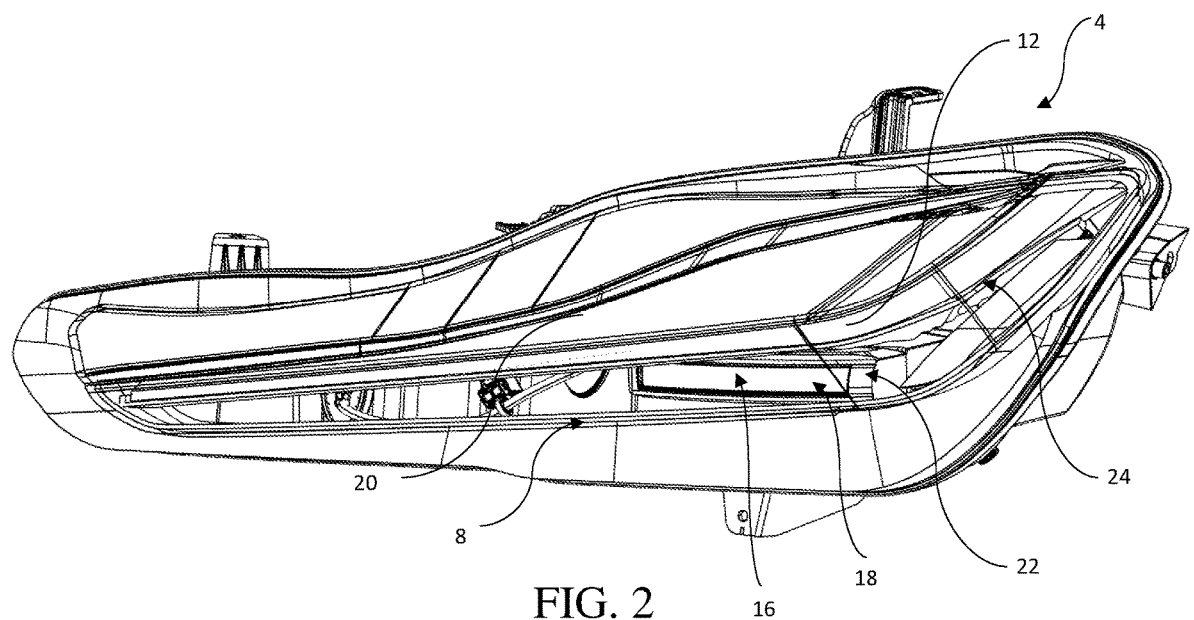
FIG. 2 illustrates a font view of the light system of FIG. 1 along lines II-II.

FIG. 2 illustrates a front plan view of the light system 4 of FIG. 1 along line II-II. The light system 4 includes headlights 8 and a daytime running light 12. The headlights 8 have a high beam 16 and a low beam 18. The high beam 16 and the low beam 18 each include light sources 20 and reflectors 22. The daytime running light (DRL) 12 includes a daytime running light lens 24 (DRL lens).

Figure 3:
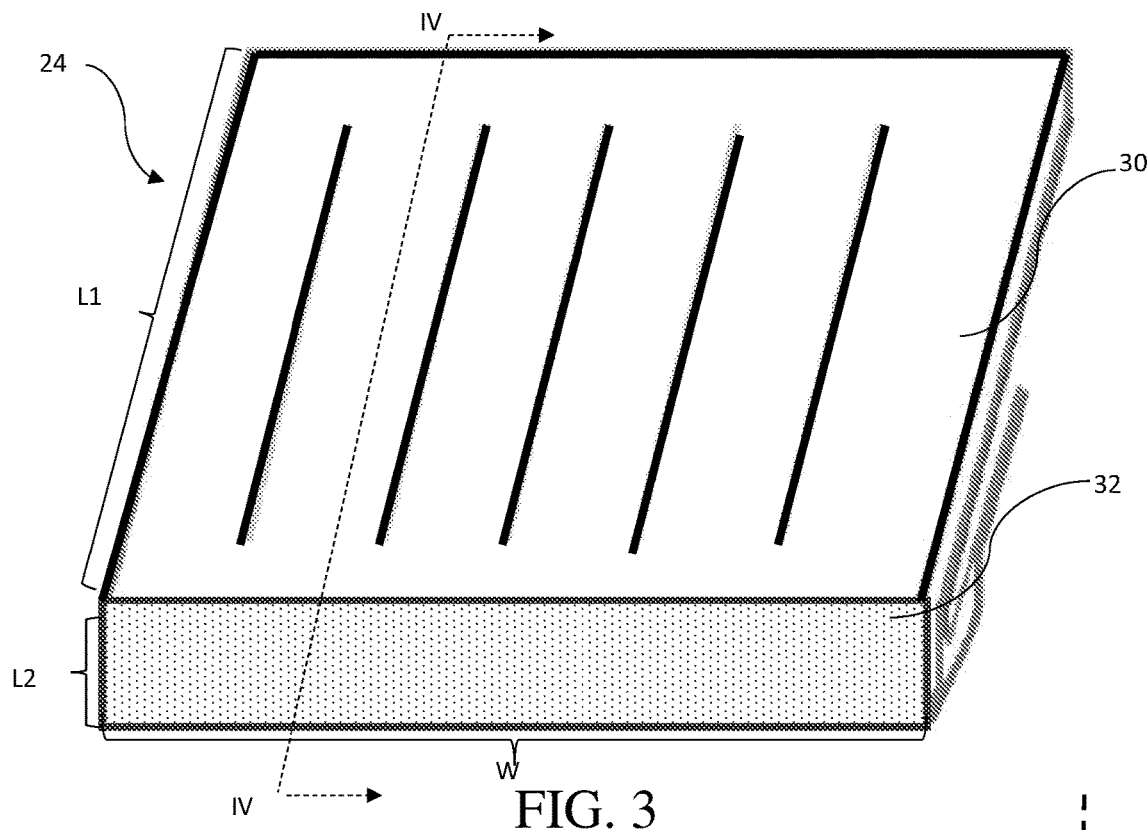
FIG. 3 is an isometric view of daytime running light of a light system.

FIG. 3 illustrates an isometric view of a lens (e.g., DRL lens, turn indicator lens, parking indicator lens) 24. The lens 24 includes a body portion 30 and a waterfall portion 32. The body portion 30 extends upward relative to the waterfall portion 32. The waterfall portion 32 is visible along a first side of the light system. During operation the waterfall portion 32 is illuminated. The body portion 30 of the lens 24 has a first length (L1) and the waterfall portion 32 has a second length (L2) so that a total length of the lens 24 is L1+L2. The length of the waterfall portion L2 is the portion of the lens 24 that is visible from a location forward of the vehicle. The lens 24 includes a width (W) that is also exposed when installed in a light system and a vehicle. The waterfall portion has a length L2 and a width W that form an area, which is illuminated.

Figure 4:
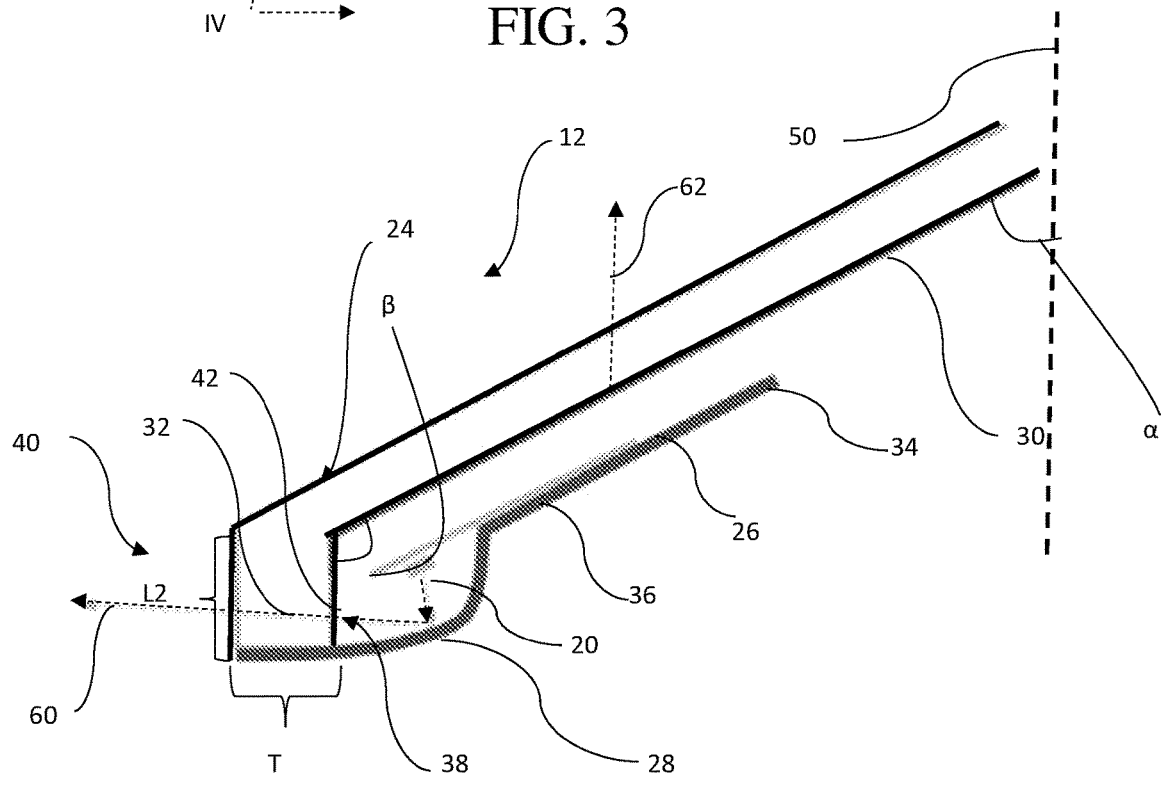
FIG. 4 is a cross-sectional view of the daytime running light of FIG. 3 along lines IV-IV.

FIG. 4 is a cross-sectional view the daytime running light lens (e.g., DRL lens, TI lens, or PI lens) 24 of FIG. 3 along lines IV-IV. The lens 24 includes a body portion 30 and a waterfall portion 32. The waterfall portion 32 may extend at an angle (B) relative to the body portion 30. The waterfall portion 32 includes a length (L2) that is visible as a primary surface and the body portion is visible as a secondary surface. A reflector 34 is located adjacent to the lens 24 and extends along the body portion 30 to the waterfall portion 32. The reflector 34 includes a planar portion 26 that extends parallel to the body portion 30 of the lens 24. The reflector 34 includes a curved portion 28 that extends from the planar portion 26. The curved portion 28 curves towards an end of the waterfall portion 32. A printed circuit board 36 extends along the reflector 34 and a light source 20 is in communication with the printed circuit board 36. The printed circuit board 36 is obscured from view behind the curved portion 28 such that someone looking at the front of the vehicle cannot see the printed circuit board 36. For example, when looking through the waterfall portion 32 along length L2 the printed circuit board 36 is not visible. The light source 20 provides light to the reflector 34 and the reflector 34 reflects the light from an interior 38 through the waterfall portion 32 and out the exterior 40 so that the height L2 is illuminated. The curved portion 28 of the reflector 22 has a shape that directs the light from the light source 20 through the waterfall portion 32 as a primary light 60 of the daytime running light 12. The light system includes a wall 50 and the body portion 30 extends at an angle (a) relative to vertical 50. For example, vertical 50 is a direction orthogonal to a road surface and the body portion 30 extends at the angle through the light system 20 relative to vertical so that a rear end is higher than a front end of the body portion 30. Light may pass through the body portion 30 as a secondary light 62.

Figure 5:
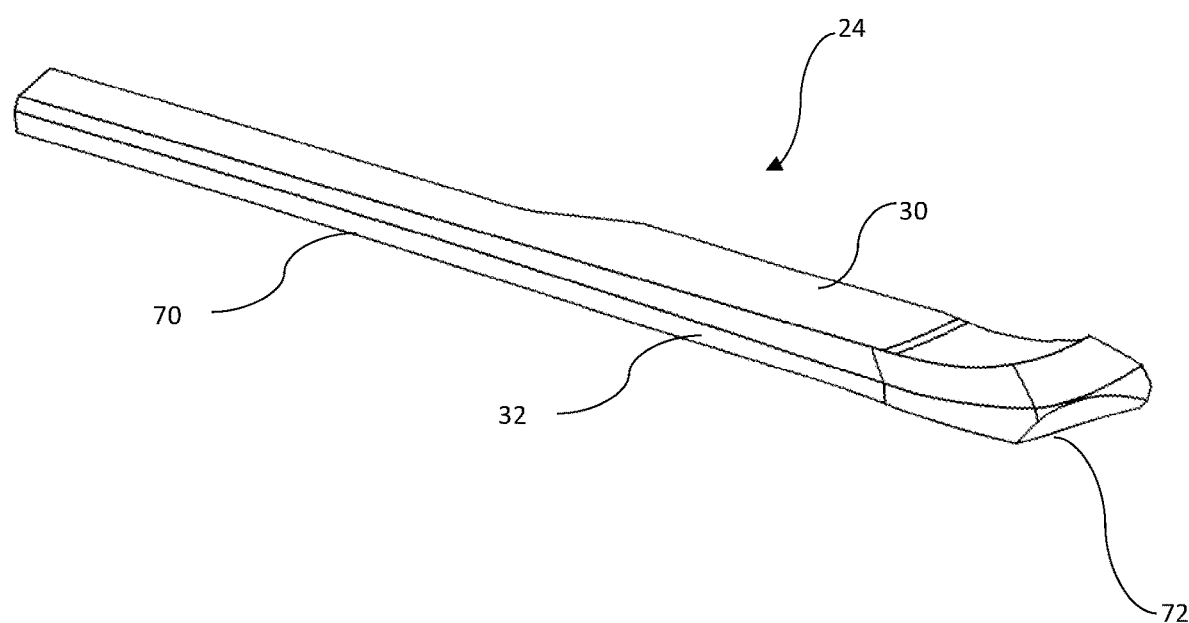
FIG. 5 is an isometric view of a daytime running light lens.

FIG. 5 is an isometric view of a lens 24, which as shown is a daytime running light lens. The lens 24 has a body portion 30 and a waterfall portion 32. The waterfall portion 32 extends in two directions so that the waterfall portion 32 has a primary side 70 (e.g., a first side) and a secondary side 72 (e.g., a second side). Thus, the primary side 70 is visible from a front of a vehicle 2 and the secondary side 72 is visible from a side of the vehicle 2 of FIG. 1.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Light System
6 Controller
8 Headlight
10 Outer Lens
12 Daytime Running Light (DRL)
14 Turn Signal
16 High Beam
18 Low Beam
20 Light Source
22 Reflector
24 Lens (e.g., DRL lens, PI lens, or TI lens)
30 Body Portion
32 Waterfall Portion
34 Reflector
36 Printed Circuit Board
38 Exterior
40 Interior
42 Texture
50 Vertical
60 Primary Light
62 Secondary Light
70 Primary Side
72 Secondary Side

We claim:

1. A light system comprising:
   a lens comprising:
      a body portion including a mounting angle where the body portion extends in a forward direction from an aft of the light system towards a fore of the light system and the body portion extends downwards as the body portion extends from the aft to the fore of the light system in the forward direction; and
      a waterfall portion that extends at an angle downward from the fore of the body portion so that the waterfall portion is exposed when the light system is installed in a vehicle;
   a reflector located adjacent to the lens;
   a printed circuit board extending between the body portion and the reflector; and
   light sources located on the printed circuit board adjacent to the lens and reflector to provide light to the reflector so that the reflector reflects the light,
   wherein the printed circuit board blocks the light from the reflector so that the light from the reflector only extends through the waterfall portion to illuminate the waterfall portion.

2. The light system of claim 1, wherein the angle the waterfall portion extends relative to the body portion is between 150 degrees or less and about 90 degrees or more.

3. The light system of claim 1, further comprising:
   an outer lens that covers the body portion and the waterfall portion of the light system.

4. The light system of claim 1, wherein the reflector comprises a planar portion that extends parallel to a portion of the body portion and a curved portion that extends from the planar portion to a location under the waterfall portion.

5. The light system of claim 1, wherein the mounting angle through the light system is about 25 degrees or more and about 75 degrees or less.

6. The light system of claim 1, wherein the waterfall portion includes a length, a width, and a thickness, and the light from the light sources extend directly through the thickness to illuminate the length and the width of the waterfall portion.

7. The light system of claim 6, wherein the length of the waterfall portion is greater than the thickness of the waterfall portion.

8. The light system of claim 1, wherein the light extends through the waterfall portion without total internal reflection.

9. The light system of claim 7, wherein the length of the waterfall portion is ten times the thickness or less the waterfall portion.

10. The light system of claim 1, wherein the printed circuit board in communication with the reflector to align the light sources with the reflector.

11. The light system of claim 10, wherein the light sources are connected to a side of the printed circuit board facing the reflector and facing away from the body portion.

12. A light system comprising:
a lens comprising:
  a body portion extending in a forward direction between a fore and an aft of the lens, the body portion comprising a fore end; and
a waterfall portion that is directly connected to the body portion at the fore end and extends at an angle away from the body portion, wherein the waterfall portion comprises:
  a length extending in a direction away from the body portion,
  a width extending parallel to the body portion, and
  a thickness of the waterfall portion extending between the fore and the aft of the lens;
a reflector located on a rear side of the body portion and comprising:
  a planar portion that extends parallel to the body portion so that light is directed from the reflector through the thickness of the waterfall portion; and
  a curved portion that extends adjacent to the waterfall portion; and
  a printed circuit board located between and extending parallel to the body portion of the lens and the planar portion of the reflector,
wherein the light only extends through the waterfall portion.

13. The light system of claim 12, wherein the lens is made of or comprises a polycarbonate, acrylic, or both.

14. The light system of claim 12, wherein the angle the waterfall portion extends from the fore end of the body portion is about 150 degrees or less to 90 degrees or more relative to the body portion.

15. The light system of claim 12, wherein the body portion extends from the aft to the fore of the light system at a downward angle within the light system.

16. The light system of claim 15, wherein the angle is about 90 degrees or less, or about 25 degrees or more.

17. The light system of claim 12, wherein the length is greater than the thickness.

18. The light system of claim 12, wherein a first set of lights produce the light that only extends through the waterfall portion and a second set of lights are configured to illuminate the body portion.

19. The light system of claim 12, wherein the waterfall portion comprises an interior and an exterior and optics are located only on an interior of the waterfall portion.

20. The light system of claim 17, wherein the printed circuit board is connected to the planar portion of the reflector that extends parallel to the body portion and the printed circuit board extends cantilever over the curved portion of the reflector that extends adjacent to the waterfall portion.

* * * * *